United States Patent [19]

Levinrad

[11] 4,334,868

[45] Jun. 15, 1982

[54] CONSTRUCTIONAL KITS

[76] Inventor: Maxim D. Levinrad, 103 San Vito, George Ave., Fairvale, Johannesburg 2001, Transvaal, South Africa

[21] Appl. No.: 234,457

[22] Filed: Feb. 17, 1981

Related U.S. Application Data

[63] Continuation-in-part of Ser. No. 11,629, Feb. 12, 1979, abandoned.

[51] Int. Cl.³ .............................................. A63H 33/08
[52] U.S. Cl. ...................................... 434/172; 46/16; 46/19; 46/31
[58] Field of Search .................. 46/16, 17, 19, 20, 31, 46/21; 434/172

[56] References Cited

U.S. PATENT DOCUMENTS

| 1,426,087 | 8/1922 | Metcalfe | 46/19 |
| 2,388,297 | 11/1945 | Slaughter | 46/19 |
| 3,545,123 | 12/1970 | Muller | 46/31 X |
| 3,827,177 | 8/1974 | Wengel | 46/31 |
| 4,212,130 | 7/1980 | Walker | 46/31 X |

FOREIGN PATENT DOCUMENTS

| 58437 | 3/1913 | Austria | 46/19 |
| 209232 | 5/1960 | Austria | 46/16 |
| 634909 | 12/1927 | France | 46/19 |
| 677190 | 3/1930 | France | 46/19 |
| 913806 | 9/1946 | France | 46/16 |
| 928157 | 5/1947 | France | 46/19 |
| 377258 | 6/1964 | Switzerland | 46/31 |
| 874810 | 8/1961 | United Kingdom | 46/19 |
| 2040701 | 9/1980 | United Kingdom | 46/31 |

Primary Examiner—Harland S. Skogquist
Attorney, Agent, or Firm—Steele, Gould & Fried

[57] ABSTRACT

A constructional kit comprising elongated connectors and panels. The elongated connectors can only be joined to panels and the panels can only be joined to connectors. Elongated connectors have no means by which they can be joined to other elongated connectors, and panels have no means by which they can be joined to other panels. The elongated connectors comprise a number of longitudinal grooves into which edges of the panels may be pressibly fitted. Certain panels formed as doors and windows are provided with oppositely extending, axially aligned pins. The elongated connectors further comprise holes formed within each groove for pivotally mounting the pin-bearing panels.

11 Claims, 15 Drawing Figures

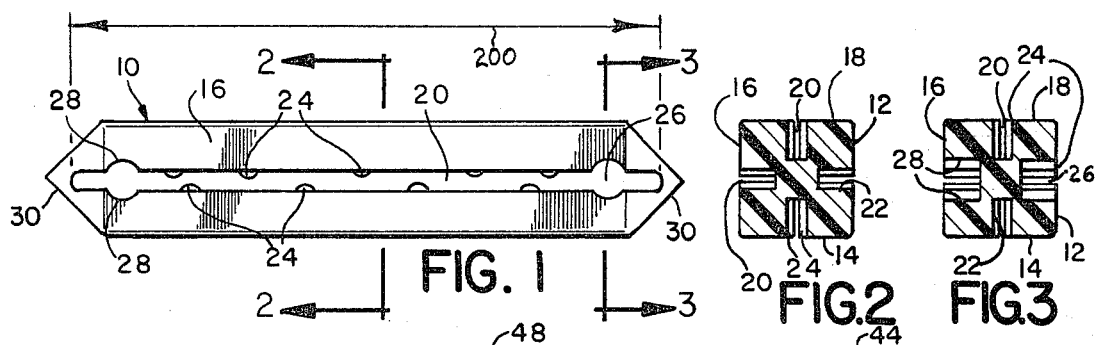
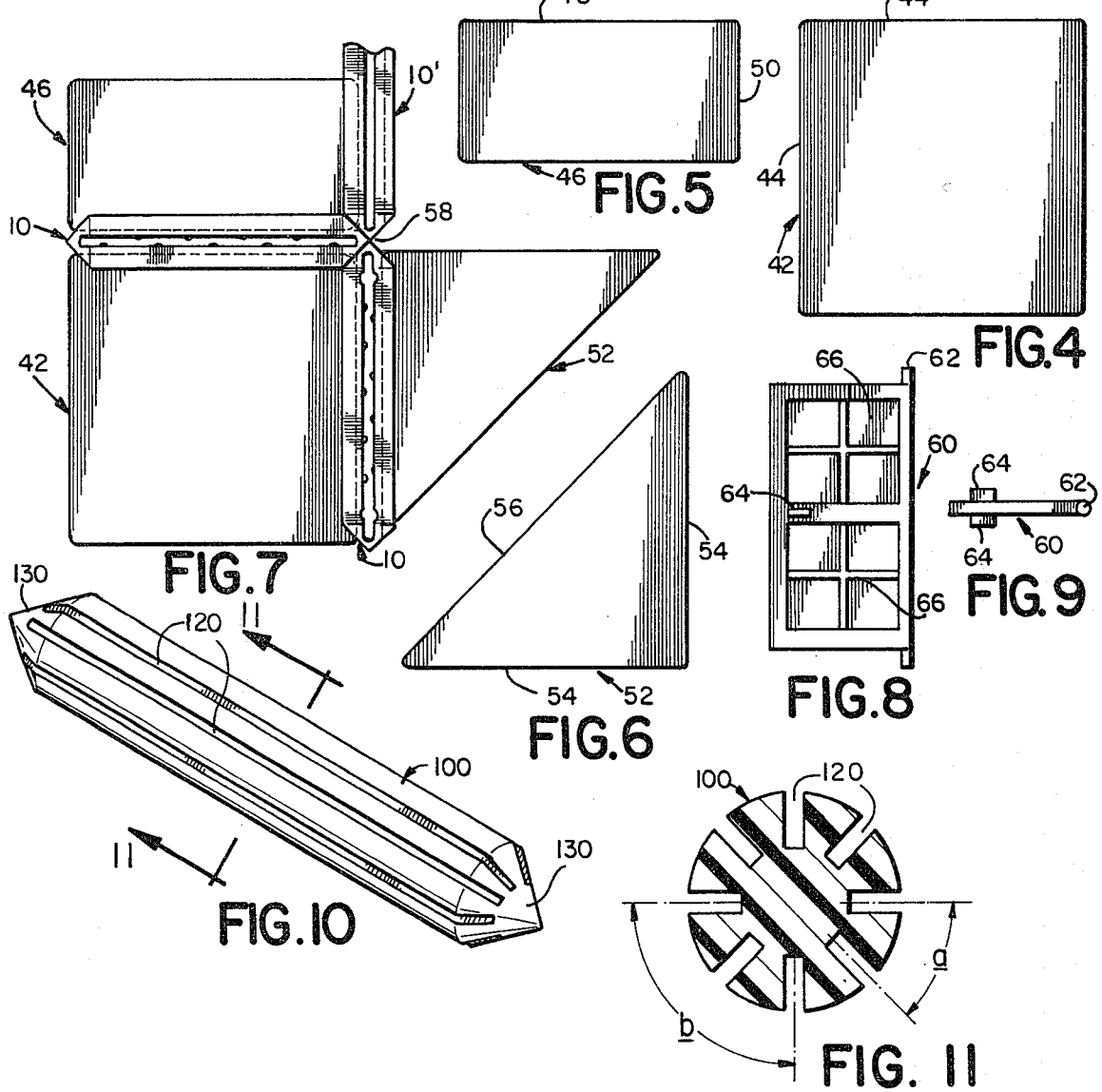
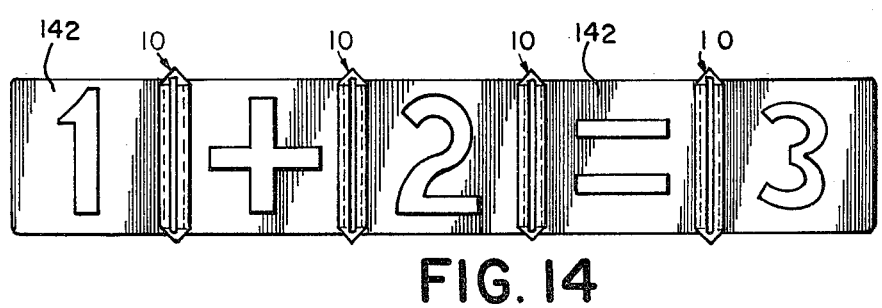

CONSTRUCTIONAL KITS

CROSS REFERENCES

This is a continuation-in-part of co-pending application Ser. No. 11,629, filed Feb. 12, 1979, now abandoned.

BACKGROUND OF THE INVENTION

1. Field of the Invention

This invention relates to constructional kits intended principally but not exclusively for building model structures such as houses, doll houses, airplanes, boats, rockets, furniture and many others. The kit may also be used to build educational structures, such as blocks, spelling and number lines and the like.

2. Prior Art

Many different kinds of constructional kits have been available over the years, with which children of all ages can construct model structures. Some require the use of nuts and bolts, some require the stacking of "logs", some utilize plastic bricks with interfitting pins and sockets and still others utilize other arrangements. For the most part, each kind of kit is suitable for constructing only one type of model structure, for example, only buildings, only houses, only log cabins and forts, and so on. Some provide the skeletons of structures whereas others provide walls without supporting skeletons. Very few are suitable to build various kinds of structures as the respective components of the kits are too specialized.

This invention recognizes the need for a constructional kit which can be used to construct the widest possible variety of structures, including but not limited to houses, airplanes, boats, rockets, doll furniture, educational structures and the like. It further recognizes the need to provide such a variety with the smallest possible number of constituent elements, in order to simplify construction and emphasize versatility. It would appear that these two contrary objectives, namely a wide variety of possible structures and the smallest variety of constituent elements would be contradictory, and this has proved to be the case in constructional kits known heretofore. In this invention, there are only two basic units of construction. One unit is an elongated connector and the other is a panel. The panels are provided in three basic shapes, squares, rectangles and triangles. The rectangles are one half the size of the squares and the triangles are equivalent to the squares being cut in half diagonally. Some of the rectangles are provided with pins for pivotal mounting, to simulate doors and windows. Each of the elongated connectors is provided with a number of longitudinal grooves, into which any of the panels may be pressibly fitted. The elongated connectors are also provided with holes into which the pin-bearing panels may be pivotally disposed. Each of the elongated connectors is substantially identical in size and shape, within manufacturing tolerances of course. While three panel shapes are provided, many structures may easily be constructed, for example, with only the square panels. Nevertheless, each of the flat panels is connectable in the same fashion. Despite this very small variety of constituent elements, the widest possible variety of structures can nevertheless be constructed.

SUMMARY OF THE INVENTION

It is an object of this invention to provide a constructional kit having the smallest variety of identically shaped constituent members, which are nevertheless capable of being interconnected to form the largest possible variety of structures.

According to the present invention such a kit includes only two basic structural members. They are elongated connectors, having a number of longitudinally disposed grooves, and panels having edges which can be pressibly fitted into the grooves. The connectors are tapered at their ends so that in mating with one another at right angles, unsightly gaps are avoided. The elongated connectors are all identical, while certain of the panels are formed as doors and windows, and are provided with oppositely extending, aligned pins. For these, the elongated connectors further comprise holes formed within some of the grooves for pivotally mounting the pin-bearing members.

In one preferred form the elongated connector is of substantially circular cross section with radially directed grooves disposed circumferentially around the connector. In another preferred from the elongated connector is of substantially square cross section, having one longitudinal groove in each side face. The connector could also be triangular or any other cross section. The panels are preferably square, rectangular and triangular, at least one dimension of each corresponding to the length of the elongated connectors. In the connectors, adjacent grooves are preferably disposed at right angles or acute angles to one another, in cross section, to enable adjacent panels to be angled accordingly. The grooves may preferably be disposed at 30° and 45° with respect to one another, as multiples of these angles provide right angles, of 90°.

In accordance with the invention, means is provided for locking the panel edges in position within the grooves. Many variations will be possible in this regard, and in one arrangement integrally molded protrusions or dimples project alternately into the grooves from the side walls of the grooves. In another, the means may comprise pins which pass through the connector and transversely through the panel edges.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

FIG. 1 is a top plan view of an elongated connector according to this invention;

FIG. 2 is a section view taken along the line 2—2 in FIG. 1;

FIG. 3 is a section view taken along the line 3—3 in FIG. 1;

FIG. 4 is a top plan view of a square panel;

FIG. 5 is a top plan view of a rectangular panel;

FIG. 6 is a top plan view of a triangular panel;

FIG. 7 is a top plan view of elongated connectors and panels joined together;

FIG. 8 is a side elevational view of a panel formed as a pivotally mountable door;

FIG. 9 is a bottom view of the door panel of FIG. 8;

FIG. 10 is a perspective view of an alternative embodiment of the elongated connector;

FIG. 11 is an enlarged section view taken along the line 11—11 in FIG. 10;

FIG. 14 is an equation or cipher line; and,

DETAILED DESCRIPTION OF THE PREFERRED EMBODIMENTS

Figure 15:
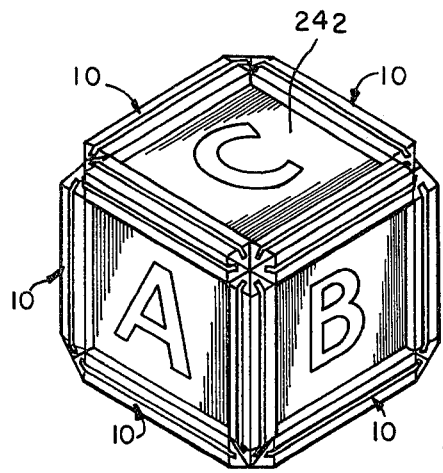
FIG. 15 is an alphabetic block.

A constructional kit according to this invention comprises only two basic structural members, elongated connectors and panels. Both of these basic structural members are preferably molded, being formed from materials providing the rigidity, flexibility and resilience needed for a toy, and for the manner of interconnection which will be described hereinafter. Many synthetic resins are suitable materials. One embodiment of an elongated connector 10 is shown in FIG. 1. The elongated connector 10 has a substantially square cross section as shown in FIGS. 2 and 3. The substantially square cross section defines four substantially rectangular sides walls 12, 14, 16 and 18. Each side wall has a flat smooth surface, broken only by a longitudinal groove 20 formed therein, which runs the length of the elongated connector. Each groove 20 has two longitudinal groove walls 22. Respective groove walls 22 of each groove are preferably provided with projections, protrusions or dimples 24. These are arranged alternately, projecting into the groove, however a sufficient space remains between so that panels described hereinafter may be pressibly fitted and held therein. Certain of the panels, as will be described hereinafter, are provided with pins for pivotal mounting. To accommodate these, each connector is also provided with two pairs of holes or sockets 26 which are actually formed by arcuate sections or depressions 28 formed in the groove walls. The sockets are preferably formed at opposite ends of oppositely facing grooves. Each connector is also formed with conically shaped, tapered ends 30 which facilitate a neat appearance in joints and corners, as shown for example in FIG. 7. The tapered ends have smooth surfaces, broken only by end portions of the grooves opening therein. The overall length of the groove base is shown at 200 in FIG. 1. A constructional kit will be provided with a large number of elongated connectors, all of which will be substantially identically sized and shaped. It should also be noted that the smooth exterior surfaces, and differences in shape between the tapered ends and the grooves provide no means whatsoever by which two elongated connectors can be connected directly to one another.

The basic panels are illustrated in FIGS. 4-6. Each panel has flat, smooth surfaces and smooth edges. FIG. 4 illustrates a square panel 42 having side edges 44. FIG. 5 illustrates a rectangular panel 46 having longer side edges 48 and shorter side edges 50. FIG. 6 illustrates a triangular panel 52 having identical side edges 54 and a longer hypotenuse side edge 56. The length of each side edge 44 corresponds to the length of the groove base of the elongated connectors. The rectangular panel 46 is approximately one half the size of panel 42, with its side edges 48 being the same length as side edges 44, and side edges 50 being one half that length. In triangular panel 52, side edges 54 are the same length as side edges 44 and 48. The length of side edges 56 is of course equal in length to a diagonal taken in panel 42. It may be appreciated that none of the panels has any means by which it can be connected to another panel.

FIG. 7 illustrates the interconnection of a square panel 42, a rectangular panel 46 and a triangular panel 52 by two elongated connectors designated 10. A third connector, designated 10' would be used to attach a fourth panel, not shown. Alternative, the structure might also be thought of as three elongated connectors joined by the three panels 42, 46 and 52. As can be seen, side edges of the panels are pressibly fitted into one of the grooves in an elongated connector. It should be clearly apparent that despite the fact that varied structures can be put together, of virtually unlimited size and shape, no two panels of any shape can be, or are ever joined one to another, and no two elongated connectors can be, or are ever joined one to another. Elongated connectors can only be joined to panels and panels can only be joined to elongated connectors. A joint zone designated 58 illustrates the neat manner in which joints may be formed as a result of the tapered ends 30. The particular structure illustrated in FIG. 7 is of course arbitrary, and should not be considered limiting in any sense.

An alternative embodiment to the rectangular panel 46 shown in FIG. 5 is the door panel shown in FIGS. 8 and 9. Door panel 60 is provided with two outwardly projecting, axially aligned pivot pins 62. The panel is provided with door handles 64 and simulated molded windows and frames 66. Although the panel 60 is somewhat smaller than panel 46 with respect to its longer dimension, the distance between the tips of pins 62 is substantially the same as that of side edge 48. Pins 62 may be pivotally disposed in sockets or holes 26 in oppositely disposed elongated connectors 10. The doors may be provided in pairs, or one door may be utilized next to a standard rectangular panel 46. The use of door panel 60 is illustrated in FIGS. 12 and 13.

An elongated connector 100 is illustrated in FIGS. 10 and 11. Elongated connector 100 is an alternative embodiment with respect to elongated connector 10. Elongated connector 100 has a substantially circular cross section. Elongated connector 100 has a smooth exterior surface broken only by longitudinal grooves 120 which are at equal spaced angular intervals around the circumference. As can be seen in FIG. 11, the angle a between adjacent grooves 120 is approximately 45°, and there are eight grooves. The angle b between every other groove is approximately 90°. Angles a might also conveniently be equal to 30°, so that every third groove would be separated by an angle of 90°. The grooves 120 are provided with projections or dimples which are the same as those shown in connection with elongated connector 10 in FIGS. 1 and 2. Elongated connector 100 is also provided with pairs of sockets or holes, which are similiar to holes 26 shown in FIGS. 1 and 3. In further analogous fashion to elongated connector 10, elongated connector 100 has two tapered ends 130. In a constructional kit according to this invention, each of the elongated connectors 100 would be substantially identically shaped and sized. Elongated connectors 100 may be used with panels as described in connection with FIGS. 4-9.

Figure 12:
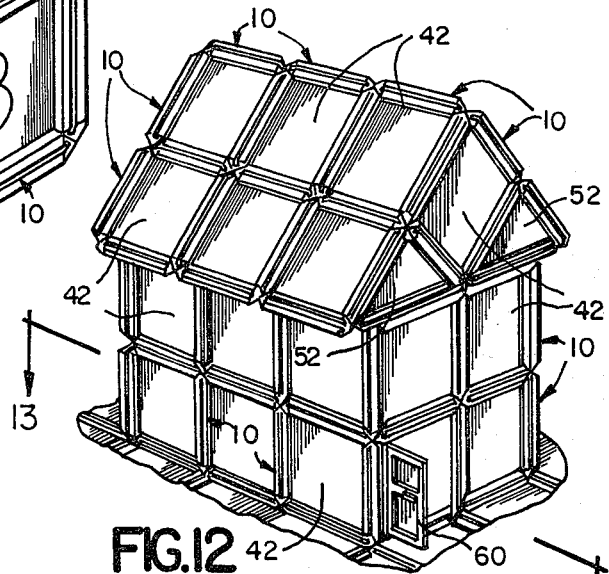
FIG. 12 is a perspective view, of a model house constructed with the members shown in FIGS. 1-9, certain details being omitted for purposes of clarification.
Figure 13:
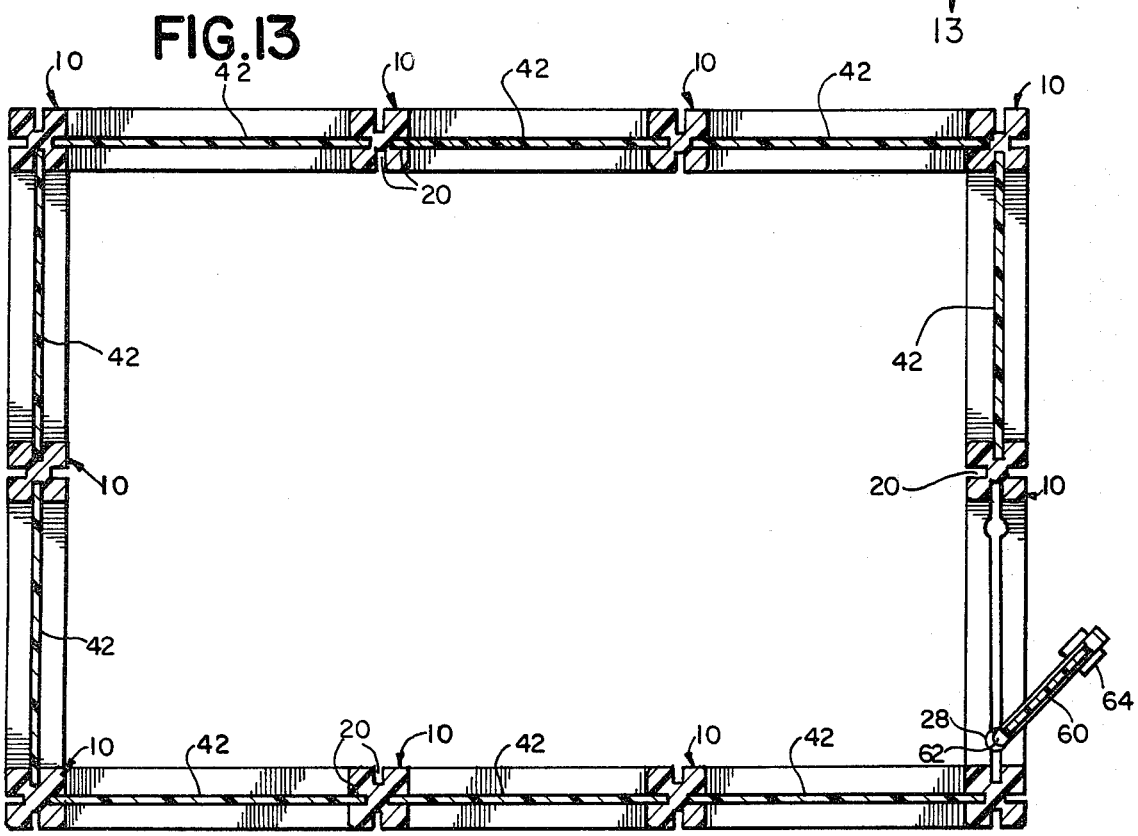
FIG. 13 is an enlarged section view taken along the line 13—13 in FIG. 12.

A typical house-like structure is illustrated diagrammatically in FIG. 12, a section thereof being diagrammatically shown in FIG. 13. As indicated, this is only one of very many different kinds of structures which can be made from this invention.

In an alternative embodiment, this invention can be utilized for educational and instructional purposes. With reference to FIG. 14, rectangular panels 142 have numerical symbols and mathematical operational symbols depicted thereon. In the example shown, one learning to add may construct the equation line or cipher "1+2=3" by joining the appropriate panels in the correct order. Subtraction, division and multiplication may be illustrated in a similar fashion. Further, fractional numbers may be easily constructed. As an alternative to the depiction of numerals, panels 242 may depict alphabetic and grammatical symbols thereon. These may be used to construct letter blocks, as shown in FIG. 15, or they may be connected serially to form words or sentences, in a manner analogous to that shown for the equation lines in FIG. 14. By connecting one or more connectors 20 to the lower edge of the equation line, the assembly is rendered self standing which has particular educational application.

All of the panels illustrated, and all of the elongated connectors may be provided in sets of different colors, to add variety and detail to the structures which are built. Some of the panels may also be transparent, so as to simulate windows and glass doors.

It is also comtemplated that locking means may be provided to assure that panels and elongated connectors are securely joined. For example, pins which pass through both the elongated connector and the panel may be utilized. Alternatively, clip members may engage the connectors and panels, or engage adjacent connectors. Although the invention is most conveniently described herein in terms of models and toys, its use is not necessarily limited to the formation of toy structures. Much larger structures, such as doll houses, garden sheds and greenhouses may also be made, provided that materials from which the elements of the constructional kit are made are sufficiently robust to withstand the additional load requirements. A constructional kit according to this invention might also be utilized to construct modular partitions in full size buildings or rooms. The locking means described above are more useful in connection with such life-size structures than in connection with toy or model structures.

This invention may be embodied in other specific forms without departing from the essential attributes or spirit thereof, and reference should be made to the appended Claims, rather than to the foregoing Specification, as indicating the scope of the invention.

I claim:

1. A constructional kit, comprising:
   a plurality of elongated connectors, each having a substantially uniform cross-section defining a smooth exterior surface broken only by longitudinal grooves formed therein, each of the grooves running substantially the length of the connector, and each connector having conically shaped, tapered ends having smooth surfaces broken only by end portions of the grooves opening therein, the smooth exterior surfaces precluding direct attachment of the elongated connectors one to another; and,
   a plurality of flat panels, each having smooth edges and substantially smooth surfaces, the smooth edges and substantially smooth exterior surfaces precluding direct attachment of the panels one to another, but facilitating attachment of the panels to the elongated connectors and of the elongated connectors to the panels, the edges of the panels being pressibly fitted into the grooves and held therein by frictional engagement, whereby self-supporting structures may be built by inter-engagement of the elongated connectors and the panels, the elongated connectors being attached only to the panels and the panels being attached only to the elongated connectors.

2. A constructional kit according to claim 1, wherein the cross-section is substantially square, defining four rectangular side walls, each having a substantially flat, smooth surface broken only by one of the longitudinal grooves.

3. A constructional kit according to claim 1, wherein the cross-section is substantially circular, and the longitudinal grooves are circumferentially spaced from one another at equal and acute angular intervals, multiples of which are approximately 90°.

4. A constructional kit according to claims 1, 2 or 3, wherein the longitudinal grooves define longitudinal groove walls within the connectors, the walls having projecting members thereon for releasably engaging the panels between the groove walls.

5. A constructional kit according to claim 4, wherein the connectors have at least two pairs of sockets formed at opposite ends of oppositely facing grooves, the sockets being formed by arcuate depressions on opposite sides of the groove walls.

6. A constructional kit according to claim 5, wherein a plurality of panels further comprise axially aligned, oppositely projecting pins, the panels being pivotally mountable between two of the elongated connectors, in the sockets formed by the arcuate depressions.

7. A constructional kit according to claim 1, wherein the elongated connectors have at least two pairs of sockets formed at opposite ends of oppositely facing grooves, the sockets being formed by arcuate depressions on opposite sides of the groove walls.

8. A constructional kit according to claim 7, wherein a plurality of panels further comprise axially aligned, oppositely projecting pins, the panels being pivotally mountable between two of the elongated connectors, in the sockets formed by the arcuate depressions.

9. A constructional kit according to claim 1, wherein the panels comprise those of square, rectangular and triangular configuration, at least one side edge of each differently shaped panel being substantially identical in length, the at least one substantially identical dimension corresponding to the length of the elongated connectors.

10. A constructional kit according to claim 1, wherein at least some of the panels bear a variety of numerical symbols and mathematical operators, whereby equation lines and number blocks may be constructed.

11. A constructional kit according to claim 1, wherein at least some of the panels bear a variety of alphabetic symbols, whereby word lines, sentence lines and letter blocks may be constructed.

* * * * *